United States Patent
Yi et al.

(10) Patent No.: US 12,424,007 B2
(45) Date of Patent: Sep. 23, 2025

(54) TEXT BLOCK SEGMENTATION

(71) Applicant: International Business Machines Corporation, Armonk, NY (US)

(72) Inventors: Ang Yi, Beijing (CN); Jing Zhang, Beijing (CN); Hai Cheng Wang, Beijing (CN); Jun Hong Zhao, ShangDi (CN); Rajesh M. Desai, San Jose, CA (US); Yang Zhong Li, Beijing (CN); Xue Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 17/814,856

(22) Filed: Jul. 26, 2022

(65) Prior Publication Data
US 2024/0046677 A1  Feb. 8, 2024

(51) Int. Cl.
*G06V 30/148* (2022.01)
*G06V 30/18* (2022.01)

(52) U.S. Cl.
CPC ...... *G06V 30/153* (2022.01); *G06V 30/18181* (2022.01)

(58) Field of Classification Search
CPC .. G06V 30/153; G06V 30/414; G06V 30/416; G06V 30/18181; G06F 40/30
See application file for complete search history.

(56) References Cited

U.S. PATENT DOCUMENTS

| | | | |
|---|---|---|---|
| 7,783,642 B1 * | 8/2010 | Feng | G06F 16/954 707/739 |
| 10,303,999 B2 | 5/2019 | Hertz | |
| 10,896,357 B1 | 1/2021 | Corcoran | |
| 2013/0236111 A1 * | 9/2013 | Pintsov | G06V 30/418 382/224 |
| 2020/0026913 A1 | 1/2020 | Northrup | |
| 2020/0184267 A1 | 6/2020 | Kumar | |
| 2020/0394243 A1 | 12/2020 | Blackman | |

(Continued)

OTHER PUBLICATIONS

Malerba et al., "Machine Learning for Reading Order Detection in Document Image Understanding", Studies in Computational Intelligence (SCI) 90, 45-69 (2008).

(Continued)

*Primary Examiner* — Daniel G Mariam
(74) *Attorney, Agent, or Firm* — Aaron N. Pontikos (57) ABSTRACT

A computer-implemented method for text block segmentation includes determining a first text block segmentation pattern utilized to generate a segmented text block based, at least in part, on a comparison of semantic information associated with the segmented text block and a plurality of predefined types of text block segmentation patterns indicated by a graph; calculating a first degree of confidence in a size of the segmented text block based, at least in part, on comparing semantic entities associated with the segmented text block with semantic entities indicated by leaf nodes stemming from a first non-leaf node included in the graph and representative of the first type of text block segmentation pattern; and determining that the size of the segmented text block is non-optimal based on the calculated degree of confidence in the size of the segmented text block being below a predetermined threshold.

17 Claims, 6 Drawing Sheets

(56) References Cited

U.S. PATENT DOCUMENTS

2021/0133476 A1   5/2021   Goodman

OTHER PUBLICATIONS

Mell et al., "The NIST Definition of Cloud Computing", Recommendations of the National Institute of Standards and Technology, NIST Special Publication 800-145, Sep. 2011, 7 pages.
Wang et al., "LayoutReader: Pre-training of Text and Layout for Reading Order Detection", arXiv:2108.11591v2 [cs.CL] Aug. 27, 2021, 10 pages.

\* cited by examiner

TEXT BLOCK SEGMENTATION

BACKGROUND

The present invention relates to computer technology, and more specifically, to text block segmentation.

Text block segmentation is a basic process in document processing that breaks a page (e.g., a scanned image of a text document) into smaller text blocks, in which contents with coherent semantics may be kept together. Word distance, text spacing, tables, lines, or other optical symbols may be used to properly segment the page into text blocks for further processing, such as text extraction, etc.

SUMMARY

According to embodiments of the present invention, an optimized text block layout is obtained by providing a scheme for adaptively adjusting text block segmentation algorithms used in different regions of a page.

According to one embodiment of the present invention, a computer-implemented method for text block segmentation is disclosed. The computer-implemented method includes determining a first text block segmentation pattern utilized to generate a segmented text block based, at least in part, on a comparison of semantic information associated with the segmented text block and a plurality of predefined types of text block segmentation patterns indicated by a graph. The computer-implemented method further includes calculating a first degree of confidence in a size of the segmented text block based, at least in part, on comparing semantic entities associated with the segmented text block with semantic entities indicated by leaf nodes stemming from a first non-leaf node included in the graph and representative of the first type of text block segmentation pattern. The computer-implemented method further includes determining that the size of the segmented text block is non-optimal based on the calculated degree of confidence in the size of the segmented text block being below a predetermined threshold.

According to another embodiment of the present invention, a computer program product for text block segmentation is disclosed. The computer program product includes one or more computer readable storage media and program instructions stored on the one or more computer readable storage media. The program instructions include instructions to determine a first text block segmentation pattern utilized to generate a segmented text block based, at least in part, on a comparison of semantic information associated with the segmented text block and a plurality of predefined types of text block segmentation patterns indicated by a graph. The program instructions further include instructions to calculate a first degree of confidence in a size of the segmented text block based, at least in part, on comparing semantic entities associated with the segmented text block with semantic entities indicated by leaf nodes stemming from a first non-leaf node included in the graph and representative of the first type of text block segmentation pattern. The program instructions further include instructions to determine that the size of the segmented text block is non-optimal based on the calculated degree of confidence in the size of the segmented text block being below a predetermined threshold.

According to another embodiment of the present invention, a computer system for text block segmentation is disclosed. The computer system includes one or more computer processors, one or more computer readable storage media, and program instructions stored on the computer readable storage media for execution by at least one of the one or more processors. The program instructions include instructions to determine a first text block segmentation pattern utilized to generate a segmented text block based, at least in part, on a comparison of semantic information associated with the segmented text block and a plurality of predefined types of text block segmentation patterns indicated by a graph. The program instructions further include instructions to calculate a first degree of confidence in a size of the segmented text block based, at least in part, on comparing semantic entities associated with the segmented text block with semantic entities indicated by leaf nodes stemming from a first non-leaf node included in the graph and representative of the first type of text block segmentation pattern. The program instructions further include instructions to determine that the size of the segmented text block is non-optimal based on the calculated degree of confidence in the size of the segmented text block being below a predetermined threshold.

BRIEF DESCRIPTION OF THE SEVERAL VIEWS OF THE DRAWINGS

Through the detailed description of embodiments of the present invention in the accompanying drawings, the above and other objects, features, and advantages of the present invention will become more apparent, wherein the same reference generally refers to the same components in the various embodiments of the present invention.

DETAILED DESCRIPTION

Some embodiments will be described in more detail with reference to the accompanying drawings, in which the embodiments of the present invention have been illustrated. However, the present invention can be implemented in various manners, and thus should not be construed to be limited to the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
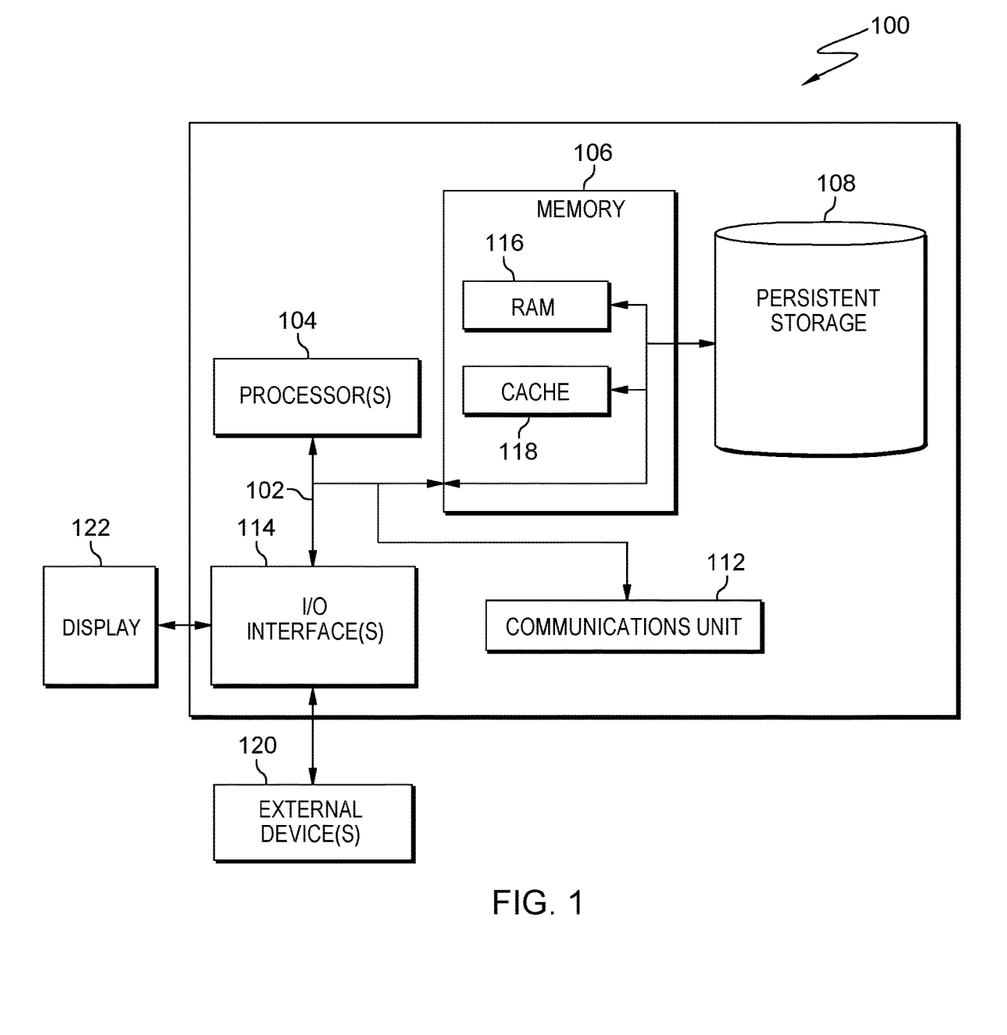
FIG. 1 is a block diagram depicting components of a computer, generally designated 12, in accordance with at least one embodiment of the present invention.

Referring now to various embodiments of the invention in more detail, FIG. 1 is a block diagram depicting components of a computing device, generally designated 100, in accordance with at least one embodiment of the present invention. Computing device 100 includes one or more processor(s) 104 (including one or more computer processors), communications fabric 102, memory 106 including, RAM 116 and cache 118, persistent storage 108, communications unit 112, I/O interface(s) 114, display 122, and external device(s) 120. It should be appreciated that FIG. 1 provides only an illustration of one embodiment and does not imply any limitations with regard to the environments in which different embodiments may be implemented. Many modifications to the depicted environment may be made.

As depicted, computing device 100 operates over communications fabric 102, which provides communications between computer processor(s) 104, memory 106, persistent storage 108, communications unit 112, and input/output (I/O) interface(s) 114. Communications fabric 102 can be implemented with any architecture suitable for passing data or control information between processor(s) 104 (e.g., microprocessors, communications processors, and network processors), memory 106, external device(s) 120, and any other hardware components within a system. For example, communications fabric 102 can be implemented with one or more buses.

Memory 106 and persistent storage 108 are computer readable storage media. In the depicted embodiment, memory 106 includes random-access memory (RAM) 116 and cache 118. In general, memory 106 can include any suitable volatile or non-volatile computer readable storage media.

Program instructions for carrying out computer processing steps of embodiments of the present invention can be stored in persistent storage 108, or more generally, any computer readable storage media, for execution by one or more of the respective computer processor(s) 104 via one or more memories of memory 106. Persistent storage 108 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 112, in these examples, provides for communications with other data processing systems or devices. In these examples, communications unit 112 can include one or more network interface cards. Communications unit 112 may provide communications through the use of either or both physical and wireless communications links. In the context of some embodiments of the present invention, the source of the various input data may be physically remote to computing device 100 such that the input data may be received, and the output similarly transmitted via communications unit 112.

I/O interface(s) 114 allows for input and output of data with other devices that may operate in conjunction with computing device 100. For example, I/O interface(s) 114 may provide a connection to external device(s) 120, which may be as a keyboard, keypad, a touch screen, or other suitable input devices. External device(s) 120 can also include portable computer readable storage media, for example thumb drives, portable optical or magnetic disks, and memory cards. Software and data used to practice embodiments of the present invention can be stored on such portable computer readable storage media and may be loaded onto persistent storage 108 via I/O interface(s) 114. I/O interface(s) 114 also can similarly connect to display 122. Display 122 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
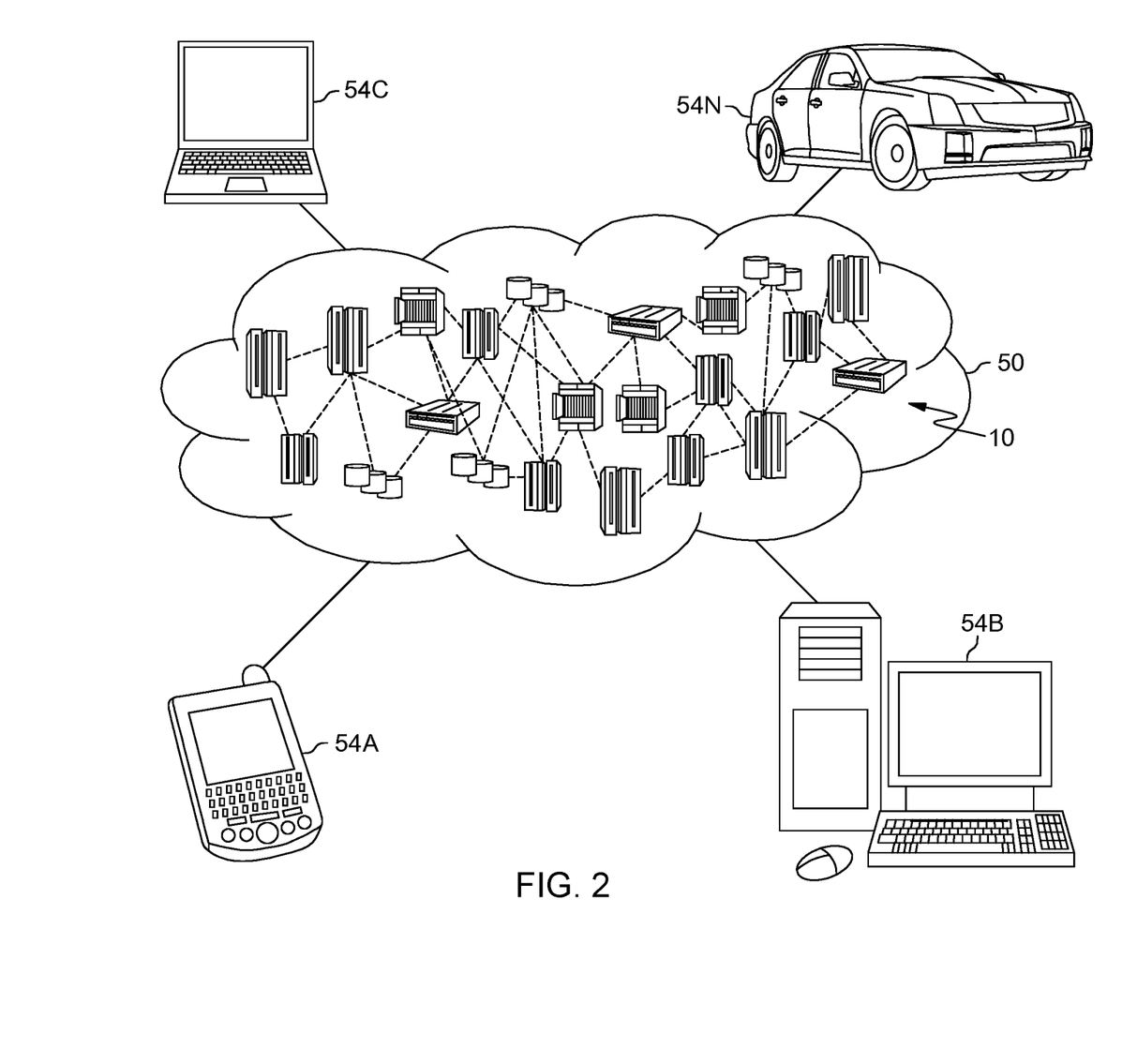
FIG. 2 is a block diagram depicting a cloud computing environment, generally designated 50, in accordance with at least one embodiment of the present invention.

FIG. 2 is a block diagram depicting a cloud computing environment, generally designated 50, in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
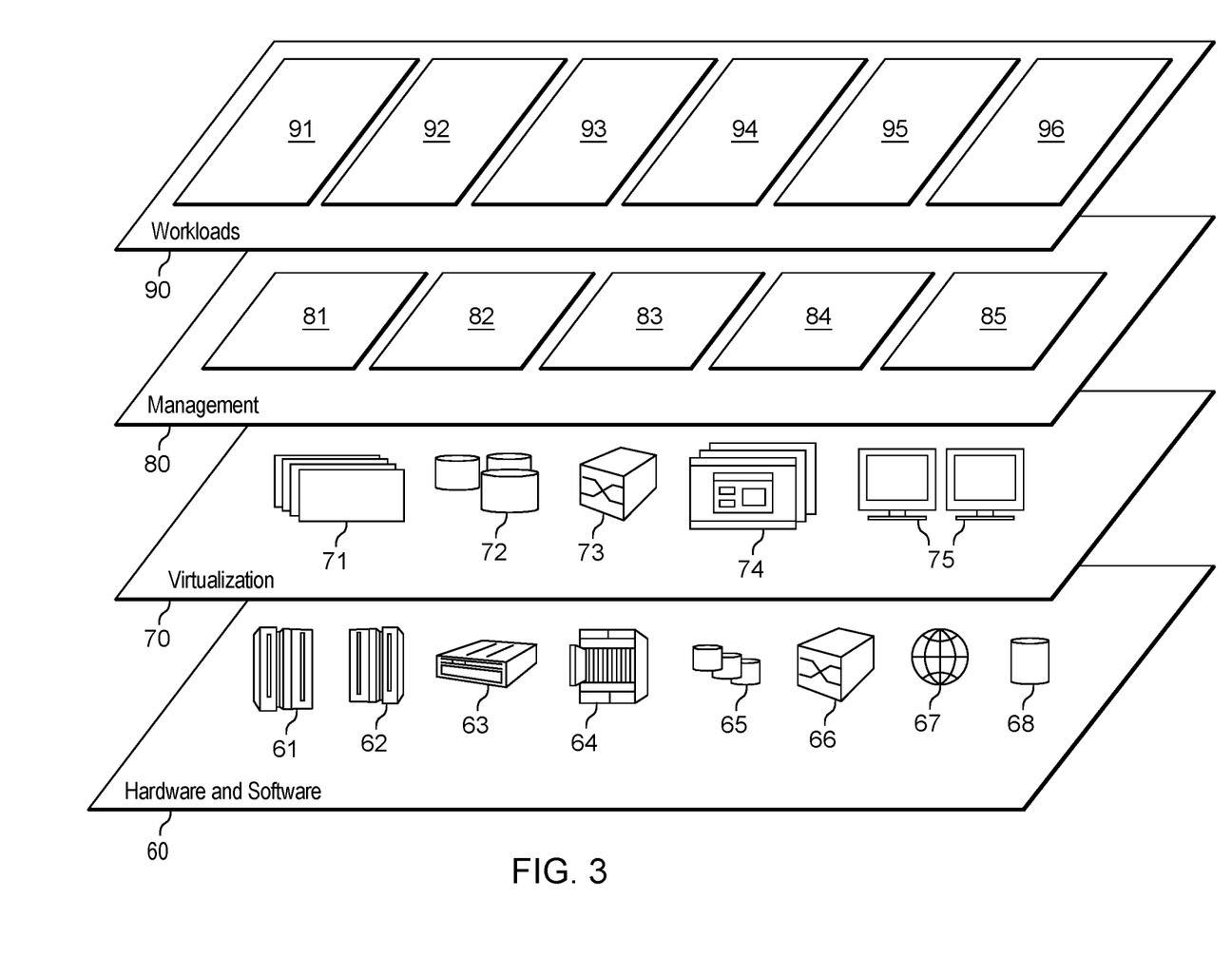
FIG. 3 is a block diagram depicting abstraction model layers in accordance with at least one embodiment of the present invention.

FIG. 3 is block diagram depicting a set of functional abstraction model layers provided by cloud computing environment 50 depicted in FIG. 2 in accordance with at least one embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and text block segmentation 96.

With reference now to FIGS. 4-9, some embodiments of the present invention will be described in further detail below. During document processing, different block segmentation algorithms may be used to segment a page (e.g., a scanned image of a text document) into a plurality of text blocks for further processing, such as text extraction. Different block segmentation algorithms may produce different text block layouts depending on their designs and predetermined thresholds.

Figure 4:
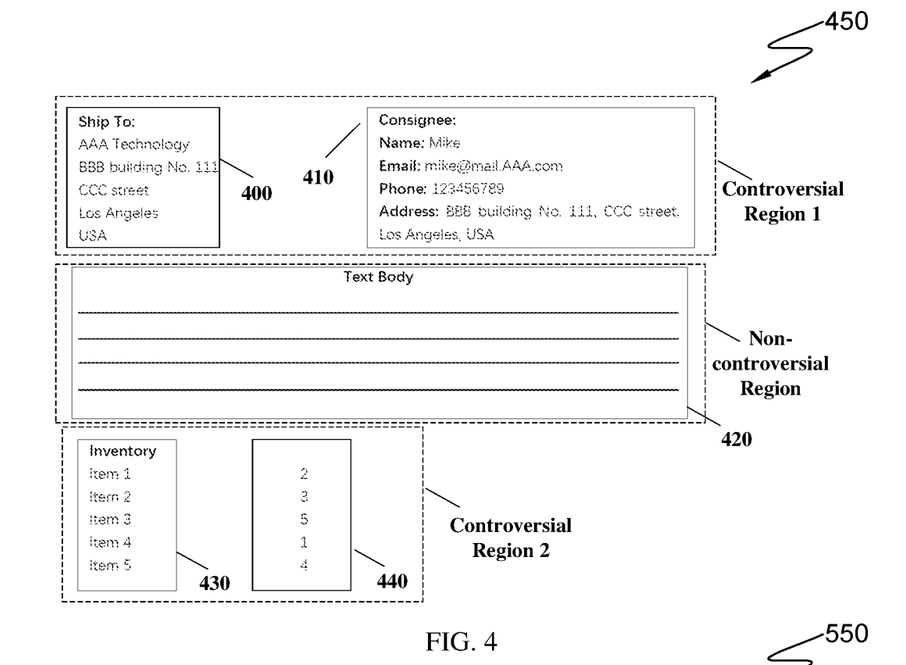
FIG. 4 depicts an exemplary text block layout A, generally designated 450, resulting from a first text block segmentation algorithm performed on a document page in accordance with at least one embodiment of the present invention.
Figure 5:
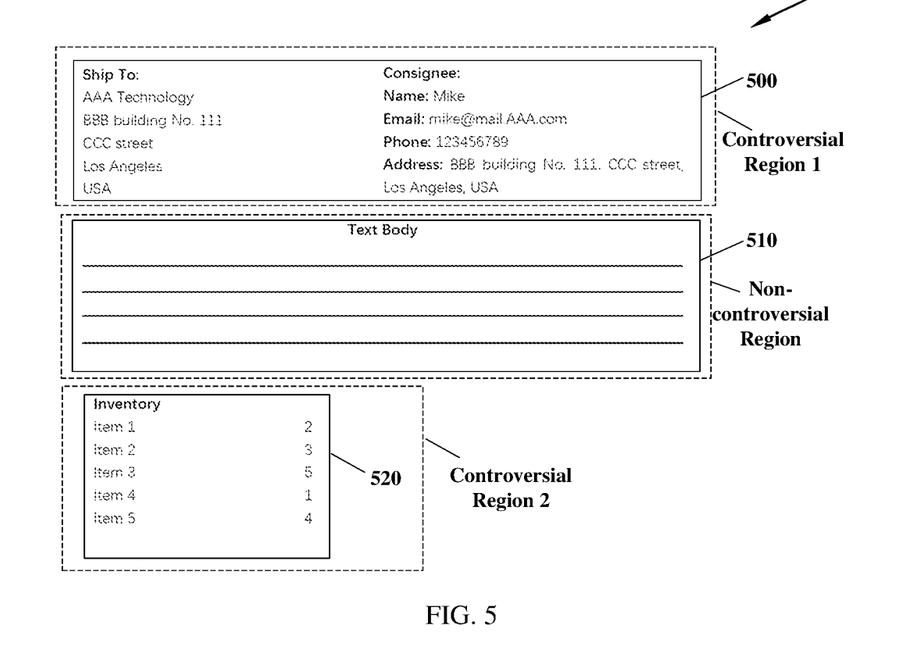
FIG. 5 depicts an exemplary text block layout B, generally designated 550, resulting from a second text block segmentation algorithm performed on the same document page of FIG. 4 in accordance with at least one embodiment of the present invention.

FIGS. 4 and 5 depict different exemplary text block layouts of a document page produced with different block segmentation algorithms. The exemplary document page being segmented in FIGS. 4 and 5 is a scanned image of a shipping list, which includes a shipping address, consignee information, text body (detailed content is omitted herein), and an inventory showing the items being shipped and corresponding numbers of the items.

FIG. 4 depicts an exemplary text block layout A (also referred to herein as the first algorithm), generally designated 450, resulting from a first text block segmentation algorithm performed on the scanned image of the shipping list in accordance with at least one embodiment of the present invention. The text block layout A 450 includes text blocks 400, 410, 420, 430 and 440. Text block 400 corresponds to a shipping address, text block 410 corresponds to consignee information, text block 420 corresponds to the text body, and text blocks 430 and 440 each correspond to a portion of the inventory.

As can be seen in FIG. 4, the inventory portion of the shipping list has been segmented into text blocks 430 and 440. However, the inventory portion of the shipping list should have been segmented into a single text block since each of text blocks 430 and 440 only include part of the inventory information. The disjointedness of the inventory information being segmented into two different text blocks may cause difficulties in further analysis and processing, and therefore, may be regarded as being non-optimally segmented.

FIG. 5 depicts an exemplary text block layout B (also referred to herein as the second algorithm), generally designated 550, resulting from a second text block segmentation algorithm performed on the same scanned image of the shipping list of FIG. 4 in accordance with at least one embodiment of the present invention. Text block layout B 550 includes text block 500 (corresponding to text blocks 400 and 410 of FIG. 4), text block 510 (corresponding to text block 420 of FIG. 4), and text block 520 (corresponding to text blocks 430 and 440 of FIG. 4). As demonstrated by the second text block segmentation algorithm performed on the shipping list, all of the information associated with inventory portion of the shipping list has been segmented into a single text block 520. The coherence of the inventory information being segmented into a single text block may result in improved analysis and processing over the inventory information being segmented into two text blocks, and therefore, may be regarded as being optimally segmented.

As further depicted in FIG. 5, the "Ship To" address text block 400 and "Consignee" address text block 410 have been segmented into a single text block 500. However, during subsequent text extraction processes, it may be difficult to successfully separate each address from one other. Therefore, text block 500 may be regarded as being non-optimally segmented, while text blocks 400 and 410, each containing a single address, may be regarded as being optimally segmented.

As can be seen from FIGS. 4 and 5, depending on the particular text block segmentation algorithm used to segment the same shipping list, different text block layouts are obtained. However, it is not easy to design a universal text block segmentation algorithm which is suitable for all regions of a document page. Therefore, there is a need to provide a scheme for adaptively adjusting the text block segmentation algorithms used in different regions of a document page in order to obtain an optimized text block layout.

Figure 6:
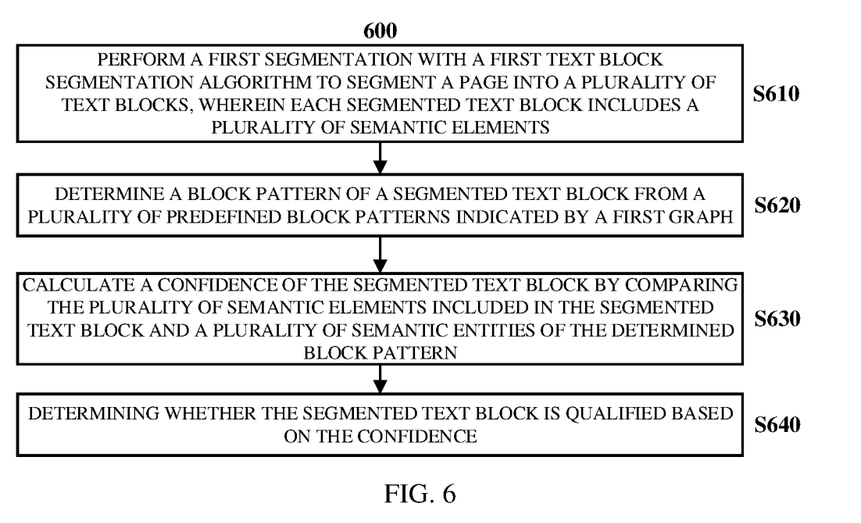
FIG. 6 is a flowchart diagram, generally designated 600, depicting operational steps for text block segmentation in accordance with at least one embodiment of the present invention.

Referring now to FIG. 6, a flowchart diagram, generally designated 600, depicting operational steps for text block segmentation in accordance with at least one embodiment of the present invention can be seen.

In some embodiments, at step S610, one or more processors perform a first text block segmentation algorithm (e.g., text block segmentation algorithm A 450 described with reference to FIG. 4 and generally referred to hereafter as "algorithm A") to segment a document page into a plurality of text blocks.

The document page described herein may be a scanned image of a text document or any other kind of document page in which further document processes, such as text extraction, is required. Algorithm A described herein may be any algorithm used to identify and categorize the regions of interest in a document page to produce an optimized text block layout for the document page. For example, Algorithm A may use word distance, text spacing, tables, lines, or other optical symbols for text block segmentation. The specific designs for Algorithm A are not limited in this disclosure.

Referring now to FIG. 4, for example, a first segmentation is performed on the document page with Algorithm A to segment the document page into text blocks 400-440. Further, each segmented text block 400-410 may include a primary semantic category and a plurality of semantic elements. Primary semantic categories and respectively associated plurality semantic elements of each segmented text block may be obtained by any generally known semantic analysis processes, including, but not limited to, Regular Expressions (RegExs), dicitionaries, and Named Entity Recognition (NER).

For example, for text block 400, the primary semantic category may be "address" and the semantic elements may include "Company" (obtained from "AAA Technology"), "building number" (obtained from "Building No. 111"), "street" (obtained from "CCC street"), "city" (obtained from "Los Angeles"), and "country" (obtained from "USA"). For text block 410, the primary semantic category may be "consignee" and the semantic elements may include "name" (obtained from "Name: Mike"), "Email" obtained from "Email: mike@mail.AAA.com", "Phone" (obtained from "Phone: 123456789"), and "Address" (obtained from "BBB building No. 111, CCC street, Los Angeles, USA"). For text block 420, the primary semantic category may be "text body" and the semantic elements are related to the text body (omitted herein). For text block 430, the primary semantic category may be "inventory" and the semantic elements may include "items" (obtained from the text in block 430). For text block 440, it may be difficult to determine the primary semantic category and associated semantic elements since only a few numbers are included in text block 440 without meaningful words/phrases.

Referring back to FIG. 6, at step S620, one or more processors determine a block pattern of a segmented text block from a plurality of predefined block patterns indicated by a first graph based on the semantics of the segmented text block.

In some embodiments, the plurality of block patterns may be predefined by a user. For example, the user may predefine required block patterns for text block segmentation via input through a user interface (UI). Table 1 shows exemplary predefined block patterns, in which each block pattern includes a pattern type and its corresponding semantic entities.

TABLE 1

| Block Patterns | Pattern Type | Semantic Entities |
|---|---|---|
| Pattern 1 | Address | Building number, street, city, country |
| Pattern 2 | Consignee | Phone, email, address (including building number, street, city, country) |
| Pattern 3 | Inventory | Item, number of item |
| ... | ... | ... |

In some embodiments, the predefined block patterns may be indicated by a graph for pattern type discovery (generally referred to hereinafter as "first graph"). Specifically, a non-leaf node of the first graph may indicate the particular pattern type of the block pattern, and leaf nodes of the first graph associated with the non-leaf node may indicate respective semantic entities of the block pattern type. In other words, a non-leaf node and its associated leaf nodes in the first graph may indicate one predefined block pattern, and the first graph as a whole may be used to store all of the predefined block patterns.

Figure 7:
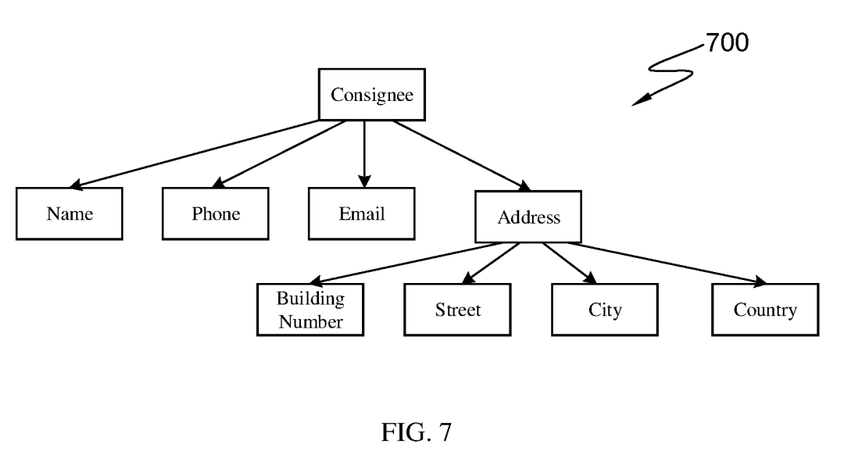
FIG. 7 depicts an exemplary graph, generally designated 700, for pattern type discovery in accordance with at least one embodiment of the present invention.

Referring now to FIG. 7, an exemplary graph for pattern type discovery, generally designated 700, in accordance with at least one embodiment of the present invention can be seen. As depicted by FIG. 7, "consignee" and "address" are non-leaf nodes representative of pattern types associated with block patterns "Pattern 1" and "Pattern 2" listed in Table 1 above. For the pattern type "address", the associated four leaf nodes indicate four semantic entities "building number", "street", "city", "country" respectively. Further, for the pattern type "consignee", there are three child nodes indicating "phone", "Email", and "address", while the child node "address" further includes four leaf-nodes indicating "building number", "street", "city", "country".

By using the graph structure, the predetermined block patterns may be structurally stored in the first graph. It should be noted that FIG. 7 only depicts a portion of the first graph, and the first graph may include other possible block patterns. It should be further noted that the graph structure of the first graph is only one example of a graph structure, and that the present invention is not limited to the depicted graph structure (e.g., the first graph may be a tree structure depending on the relationships between semantic entities of the predetermined block patterns).

In some embodiments, the first graph may be prepared in advance. In an embodiment, the first graph may be a user-specific graph which meets the user's specific requirements. For example, the user may provide user-defined requirement documents for generating the first graph. The user-defined requirement documents may include sample documents. In an alternative embodiment, the first graph may be generated based on the required block patterns for text block segmentation (e.g., Table 1) which are input by a user input via, for example, a user interface (UI).

In some embodiments, the first graph may be generated based, at least in part, on a user datastore. For example, the user datastore may include historical block pattern information, including, but not limited to, previous block patterns required by the user or previous format requirements and properties for semantic entities. In this case, the user datastore may be referenced to generate the first graph.

In some embodiments, a public graph database may further be referenced to tailor and enrich the semantic entities the first graph. For example, there may be different format requirements for addresses in different countries. These format requirements may be stored in the public graph database and used for tailoring the semantic entities of the first graph. Further, synonymous concepts associated with the semantic entities may be retrieved from the public graph database to enrich the semantic entities. For example, for the semantic entity "address", there may be synonymous concepts such as "postal mail address", "ship to", "addr.", etc. These synonymous concepts may be attached to the semantic entity "address" as attributes to improve the accuracy of various text block segmentation processing steps, such as text block pattern determination (step S620) and qualification of the text block (steps S630 and S640).

The first graph exemplified in FIG. 7 may be used for pattern type discovery. In some embodiments, by performing semantic analysis on a segmented text block, the semantics of the segmented text block (e.g., the primary semantic category) may be obtained. For example, the primary semantic category of text block 400 may be "address". The block pattern of the segmented text block may be determined based on the semantics thereof according to the first graph. Non-leaf nodes in the first graph may be searched to find one or more non-leaf nodes indicating a pattern type which matches the primary semantic category associated with the segmented text block. For example, the non-leaf node "address" is found which matches the primary semantic category "address" of the segmented text block. Therefore, the block pattern of the text block 400 may be determined as "address" in S620 of method 600. Similarly, the block pattern of the text block 410 may be determined as "consignee".

In some embodiments, Key-Value Pairs (KVPs) are generated for a segmented text block, wherein a key of the KVP indicates key semantic information of the segmented text block and values of the KVP correspond to respective semantic elements of the text block. In some embodiments, generating KVPs includes locating the complete text block and parsing out meaningful segments from the text block through known semantic analysis processes.

For example, for text block 400 in FIG. 4, the KVPs of text block 400 is shown in Table 2 below, which includes a key "address" and four values "building number", "street", "city", and "country" with detailed information for each value.

TABLE 2

| Key | Address | |
|---|---|---|
| Values | Building number | BBB building No. 111 |
| | Street | CCC street |
| | City | Los Angeles |
| | Country | USA |

In some embodiments, a composite KVP may be generated which supports structural values such as a tree structure or graph structure. For example, for text block 410 in FIG. 4, a composite KVP may be formed, which includes a key "consignee" and four values: "name", "phone", "Email", "address", and the value "address" further includes four sub-values: "building number", "street", "city", and "country". The composite KVP according to the present disclosure may have a similar structure as the first graph shown in FIG. 7, which may further facilitate matching of a composite KVP and a block pattern stored in the first graph.

In some embodiments, the key of the KVP of a segmented text block may be used to determine the block pattern of a text block. Specifically, a first non-leaf node which matches the key of the KVP may be searched in the first graph. As an example, taking the segmented text block 400 shown in FIG. 4, the key of the KVP of text block 400 is shown in Table 2 as "address". Therefore, a search may be performed in the first graph (e.g., the graph shown in FIG. 7) for a non-leaf node which matches the key "address". As shown in FIG. 7, the non-leaf node "address" may be found. Therefore, the block pattern indicated by the non-leaf node "address" may be determined as the block pattern of text block 400.

In some embodiments, the KVPs of a segmented text block may be used to determine the block pattern of the text block. Specifically, a first leaf node may be searched in the first graph to determine whether a semantic entity indicated by the first leaf node matches a value of the KVP. For example, for a value "street" of the KVP in Table 2, a leaf node "street" may be searched in the graph shown in FIG. 7 that matches the value "street" of the KVP. Further, one or more non-leaf nodes which are associated with the first leaf node may additionally be searched. For example, non-leaf nodes and the associated block patterns "address" and "consignee" can be searched since they are all associated with the leaf node "street". Accordingly, the block patterns "address" and "consignee" may be identified as candidate block patterns.

In some embodiments, in order to determine the block pattern of a text block from one or more candidate block patterns, for each candidate block pattern, a degree of matching between the values of the KVPs and the semantic entities indicated by leaf nodes of a candidate block pattern may be determined.

In some embodiments, the degree of matching may be determined by the following equation:

$$\text{Matching degree} = \frac{\text{number of matched values of the } KVP}{\text{total number of semantic entities of the candidate block pattern}}$$

Table 3 shows the degree of matching for the candidate block patterns "address" and "consignee" associated with text block 400. Since the degree of matching for "address" is higher than the degree of matching for "consignee", the candidate block pattern "address" may be determined as the optimal block pattern for text block 400.

TABLE 3

| Block Pattern | Entity | Match in text block | Matching degree |
|---|---|---|---|
| Address | PO box | × | 4/5 = 80% |
|  | Building number | √ |  |
|  | Street | √ |  |
|  | City | √ |  |
|  | Country | √ |  |
| Consignee | Name | × | 4/8 = 50% |
|  | Phone | × |  |
|  | Email | × |  |
|  | PO box | × |  |
|  | Building number | √ |  |
|  | Street | √ |  |
|  | City | √ |  |
|  | Country | √ |  |

Referring back to FIG. 6, at step S630, a degree of confidence is calculated for the segmented text block by comparing the semantic elements included in the segmented text block to the semantic entities of the determined optimal block pattern.

In some embodiments, the degree of confidence may be similarly calculated as the degree of matching. For example, after determining the optimal block pattern for text block 400 is "address", the degree of confidence that "address" is the optimal block pattern for segmented text block 400 may be calculated by the following equation:

$$\text{Confidence} = \frac{\text{number of matched values of the } KVP}{\text{total number of semantic entities of the candidate block pattern}}$$

According to the above listed equation, the degree of confidence that "address" is the optimal block pattern for segmented text block 400 is 80%.

In some embodiments, in addition to the block pattern type and semantic entities associated with a block pattern, an expected number of each semantic entity may also be stored as an attribute of the non-leaf node indicating the block pattern in the first graph. For example, as shown in Table 4 below, for the block pattern "address", the expected number of each semantic entity is set as "1".

TABLE 4

| Block Pattern | Entity | Expected | Found in block 400 | Confidence |
|---|---|---|---|---|
| Address | PO box | 1 | 0 | 4/5 = 80% |
|  | Building number | 1 | 1 |  |
|  | Street | 1 | 1 |  |
|  | City | 1 | 1 |  |
|  | country | 1 | 1 |  |

Further, the number of semantic elements found in a segmented text block may be determined. In some embodiments, a method for searching a matched semantic entity of a block pattern in a KVP of a segmented text block may also be defined and stored as an attribute of the non-leaf node indicating the block pattern in the first graph. For example, for the entity "PO box", a method "RegEx" is defined, and the method "RegEx" will be used when searching the KVPs of a segmented text block for a value that matches the entity "PO box". For different semantic entities, different searching methods (such as Dictionary, NER, etc.) may be defined. As shown in the column "Found in block 400" in Table 4, the corresponding number of matched values of the KVPs of text block 400 are listed.

Taking into considering the expected number of semantic entities for a given text block, a degree of confidence may be calculated by dividing the number of matched values of the KVP by the total number of semantic entities of a candidate block pattern, which in the case of Table 4 above, is 4/5 for the block pattern "address". For one semantic entity, if the expected number x equals the found number y, f(x, y)=1, otherwise, f(x, y)=1. The degree of confidence is an average of f(x, y) for each semantic entity. Based on the above listed equation, the degree of confidence for text block 400 is calculated as "80%".

At step S640, a determination is made whether the segmented text block is qualified based on the degree of confidence. For example, a confidence threshold may be set (e.g., 75%). If the confidence of a segmented text block is above the confidence threshold, it may be determined as a segmented text block. Since the confidence of text block 400 is 80%, and thus above the threshold 75%, it may be determined as qualified or optimal.

In some embodiments, for each segmented text block of the document page, steps S620-S640 may be performed to determine whether each segmented text block is qualified or optimal.

For example, for text block 430, the block pattern "inventory" may be determined at S620. Further, a degree of confidence may be calculated at step S630 by comparing the semantic element "item" in text block 430 and the semantic entities "item" and "number of item" of the block pattern "inventory" shown in Table 1. For example, a degree of confidence of 50% may then be calculated for text block 430 as shown below with reference to Table 5. Since the degree of confidence (50%) of text block 430 is less than the confidence threshold 75%, it may be determined as not qualified or un-optimal.

TABLE 5

| Block Pattern | Entity | Match in text block | Confidence |
| --- | --- | --- | --- |
| Inventory | Item | √ | ½ = 50% |
|  | Number of item | × |  |

Figure 8:
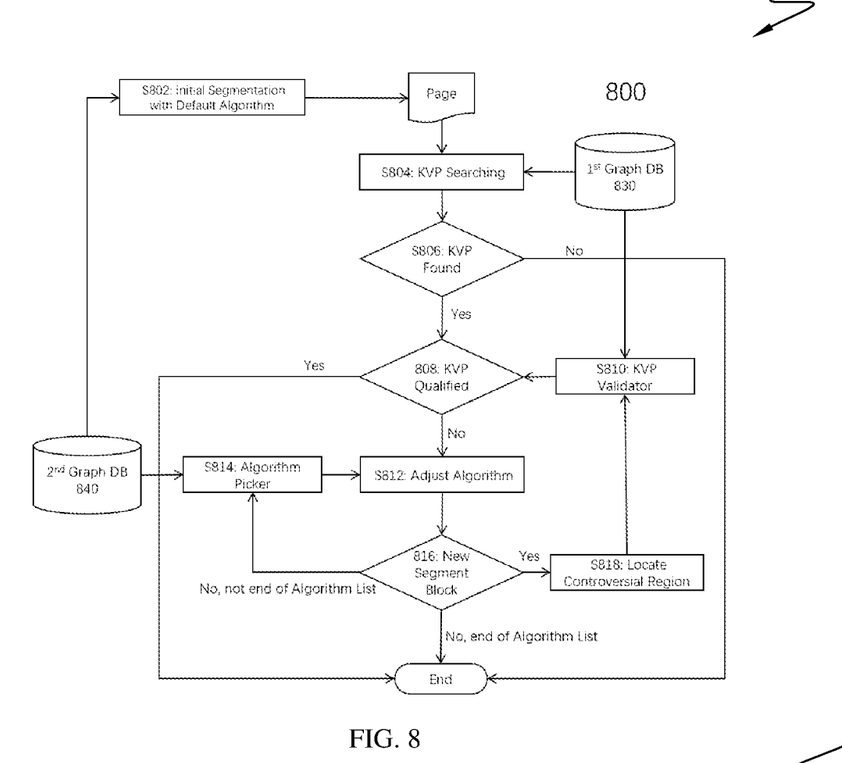
FIG. 8 is a flow chart diagram, generally designated 800, depicting operational steps for text block segmentation in accordance with at least one embodiment of the present invention.

Referring now to FIG. 8, operational steps for text block segmentation, generally designated 800, in accordance with at least one embodiment of the present invention can be seen. At step S802, for a document page (e.g., the page of shipping list shown in FIGS. 4 and 5), an initial segmentation is performed on the document page with a default algorithm (e.g., the algorithm A performed in FIG. 4), to obtain a text block layout (e.g., text block layout A 450 shown in FIG. 4). In an embodiment, step S802 may correspond to step S610 of FIG. 6.

At step S804, a KVP search is performed for each segmented text block obtained in step S802 to find KVPs for each text block. The KVP search may be performed by any known processes, including, but not limited to, RegEx (such as Key Alias (RegEx) Searching), Dictionary, NER, or other semantic analysis processes.

Using text block 400 in FIG. 4 for example, KVPs with the key "address" and four values "building number", "street", "city" and "country" may be identified. Text block 400 may be constructed into the found KVPs. Further, if a KVP of a segmented text block is found, the block pattern of the segmented text block may be determined by similarly performing step S620 of FIG. 6. For example, and as discussed above, for the KVPs of text block 400, the key "address" may be used to determine the block pattern. In some embodiments, one of the four values may be used to determine candidate block patterns, and the block pattern of text block 400 may be determined as the optimal candidate block pattern based on a degree of matching calculated from the values of the KVPs and the semantic entities of a candidate block pattern.

At step S806, if a KVP is found, the method continues to step S808 to determine whether the KVP is qualified or optimal. If the KVP is qualified or optimal, the corresponding segmented text block is also deemed as qualified or optimal. In order to determine whether the KVP is qualified or optimal at step S808, a KVP validator may be used at step S810. The KVP validator of step S810 may perform steps S630 and S640 of FIG. 6 to determine whether the KVP (and the corresponding segmented text block) is qualified or optimal. Further, when performing steps S630 and S640, the KVP validator may refer to the first graph DB 830 (corresponding to "the first graph" of FIG. 4) to search for the first graph. In addition, if no KVP is found at step S806, processing ends.

At step S808, if it is determined that the KVP of the segmented text block (e.g., text block 400) is qualified or optimal, steps S804-S810 may be performed for other segmented text blocks in the document page.

At step S808, if it is determined that the KVP of the segmented text block (e.g., text block 430) is not qualified or un-optimal, processing proceeds to step S812 to adjust the default algorithm (e.g., algorithm A used in step S802).

In some embodiments, at step S812, a directional guidance (e.g., enlarging or shrinking of the segmented text block) is determined by comparing the semantic elements included in the text block to the semantic entities of the determined block pattern. Specifically, in a case where the number of semantic elements included in the segmented text block is less than the number of semantic entities of the block pattern, the segmented text block may be enlarged. Using text block 430 as an example, the number of semantic elements equals "1" (only "item" is included), while the number of semantic entities of the block pattern "inventory" equals "2" (including both "item" and "number of item"). Since the number of semantic elements is less than the number of semantic entities, it may be suggestive that the text block was initially segmented too small for the corresponding block pattern, and thus, the size of the text segment should be increased.

Similarly, in a case where the number of semantic elements included in a segmented text block is greater than the number of semantic entities of the block pattern, it may be suggestive that the text block was initially segmented too large for the corresponding block pattern, and thus, the size of the segmented text block should be decreased.

In some embodiments, at step S814, a second text block segmentation algorithm (e.g., text block segmentation algorithm B described with reference to FIG. 5) (also referred to herein as "algorithm B") is selected based on the directional guidance from a second graph DB 840 (also referred to herein as "second graph").

The second graph is used for storing text block segmentation algorithms and the relations between different algorithms. In some embodiments, and with respect to the second graph, a first node may indicate the first text block segmentation algorithm (e.g., Algorithm A), a second node may indicate the second text block segmentation algorithm (e.g., Algorithm B), and an edge from the first node to the second node may indicate a direction of change (e.g., increase or decrease) in the size of a text block segment when utilizing the first text block segmentation algorithm vs. the second text block segmentation algorithm. Additional algorithms and relations therebetween may similarly be stored in the second graph.

The second graph may be prepared in advance. In some embodiments, a source repository (e.g., GitHub) may be accessed to obtain one or more available text block segmentation algorithms. The resultant text block layouts produced by the one or more algorithms may be evaluated to determine the relationships between the algorithms. For example, if a size of segmented text block produced by Algorithm A is smaller than a size of a segmented text block produced by Algorithm B, the relationship between Algorithm A and Algorithm B may be determined as "enlarging", and vice versa. Based on the above evaluation for segment size, the second graph may be generated such that each node indicates an algorithm and an edge between two nodes indicates the relation ("enlarging" or "shrinking") between two algorithms indicated by the two nodes.

In some cases, each algorithm may be attached with a min/max threshold for various factors, such as word distance, text spacing, etc., which may affect the text block layout produced by the algorithm. The threshold of each algorithm may be considered when generating the second graph. In some embodiments, a node may indicate an algorithm with a specific combination of thresholds within a range from the min to the max threshold. Using Algorithm A for example, and assuming that the threshold of word distance is from one character to two characters, and the threshold of text spacing is from single spacing to double spacing, four nodes A1-A4 related to algorithm A may be generated in the second graph, as shown in Table 6 below.

TABLE 6

| Node | Algorithm | Threshold of word distance | Threshold of text spacing |
|------|-----------|----------------------------|---------------------------|
| A1   | A         | One character              | Single spacing            |
| A2   | A         | One character              | Double spacing            |
| A3   | A         | Two characters             | Single spacing            |
| A4   | A         | Two characters             | Double spacing            |

In some embodiments, at S814, the default algorithm may also be determined from second graph DB 840. In some embodiments, the default algorithm may be fixed for all document pages. In some embodiments, the default algorithm may be randomly determined for each page. Further, in some embodiments, the default algorithm may be determined depending on different document pages. Specifically, for a node indicating an algorithm, an attribute may be associated with a node, thereby indicating the most suitable pattern type to be performed by the algorithm. For example, if node A is associated with Algorithm A, an attribute indicating "address" may be attached, while if node B is associated with Algorithm B, an attribute indicating "inventory" may be attached. For a document page to be processed, a preliminary analysis may be performed to determine the most related pattern or highest matching pattern, so as to determine the default algorithm.

In some embodiments, at step S814, and based on the directional guidance (e.g., "enlarging" for text block 430 segmented with Algorithm A), since the edge from Algorithm A to Algorithm B indicates the directional change "increasing in size," Algorithm B is selected from the second graph DB 840 to enlarge the size of segmented text block 430.

In some embodiments, in response to selecting Algorithm B from second graph DB 840, a second block segmentation with Algorithm B is performed to re-segment (i.e., adjust the segmentation size) of previously segmented text block. For example, step S610 or step S802 may be further performed with Algorithm B.

At step S816, a determination is made as to whether a new text block layout is produced by Algorithm B. For example, text block 500 segmented with Algorithm B in FIG. 5 may be compared to text block 400 segmented with algorithm A to determine if a size in the text blocks have changed. In this example, since text block 500 is changed from text block 400 (e.g., changed in size/word numbers/location, etc.), it may be determined as a new text block.

At step S816, if it is determined that a segment block is not produced, an algorithm list may be checked to determine whether it is the end of the algorithm list, i.e., whether all algorithms have been performed at step S812. The algorithm list may be prepared in advance together with the preparation of the second graph DB 840. The algorithm list may include one or more segmentation algorithms stored in the second graph DB 840. In some embodiments, the algorithms in the algorithm list may be sorted based on their relationships (e.g., "enlarging" and "shrinking") between nodes in second graph DB840. If it is determined at step S816 that all algorithms included in the algorithm list have been utilized, the process ends.

If it is determined at step S816 that a new segment block exists, the process proceeds to step S818 to locate controversial regions in the document page. In some embodiments, a controversial region of the document page in which a text block layout is changed (e.g., size change of text block, location change of text block, words change in text block, etc.) as a result of performing a second text block segmentation algorithm is compared to the text block layout resulting from the previous performance of a first text block segmentation algorithm. For example, by comparing the text block layouts in FIGS. 4 and 5, controversial region 1, controversial region 2, and a non-controversial region may be identified. For controversial region 1 and controversial region 2, since the text block layouts are different, an algorithm adjustment may be necessary to determine proper text block segmentation algorithms for these controversial regions.

In some embodiments, for each text block associated with a controversial region, the KVP validation may be performed at S810 to determine whether the segmented text block using the first segmentation algorithm (e.g., Algorithm A) should be replaced by the re-segmented text block using the second segmentation algorithm (e.g., Algorithm B).

For example, for a re-segmented text block 500, a block pattern may be determined based on semantics of the text block from the first graph DB 830. This process is similar to step S620 of FIG. 6. In this example, the block pattern of text block 500 may be determined as "address" based on the semantics of text block 500, since two addresses (one in "ship to" and the other in "consignee") are recited in this block.

Further, a confidence of the re-segmented text block associated with the controversial region may be determined by comparing the semantic elements included in the re-segmented text block and the semantic entities of the determined block pattern. This process is similar to step S630 of FIG. 6.

Similar to the equations used for calculating the degree of confidence of text block 400 in FIG. 4, the degree of confidence of text block 500 may be determined as 0% as shown in Table 7 below.

TABLE 7

| Block Pattern | Entity          | Expected | Found in block 500 | Block confidence |
|---------------|-----------------|----------|--------------------|------------------|
| Address       | PO box          | 1        | 0                  | 0%               |
|               | Building number | 1        | 2                  |                  |
|               | Street          | 1        | 2                  |                  |
|               | City            | 1        | 2                  |                  |
|               | country         | 1        | 2                  |                  |

Further, a degree of confidence of a controversial region may be calculated based on the following equation:

$$\text{Region Confidence} = \frac{\sum_{i=1}^{n} f(\text{Block confidence}_i)}{n}$$

$$f(x) = \begin{cases} 0, & x < \text{block confidence threshold} \\ 1, & x \geq \text{block confidence threshold} \end{cases}$$

where "block confidence" denotes a confidence of a text block included in the controversial region, n is the number of text blocks included in the controversial region, and the block confidence threshold is set as 75%. It should be noted that the above listed equation is only one example for calculating the region confidence, and that other known calculations for determining the region confidence of a text block included in a controversial region may be used. For example, an average block confidence of a plurality of text blocks included in a controversial region may be determined as the region confidence.

Further, for the controversial region 1 in FIG. 4, the region confidence is similarly calculated. Specifically, block confidences of text blocks 400 and 410 are calculated first. For text block 400, the confidence is determined from Table 4 as 80%. For text block 410, the confidence may be determined from the following Table 8 as 87.5%.

TABLE 8

| Block Pattern | Entity | Expected | Found in block 410 | Block confidence |
|---|---|---|---|---|
| Consignee | Name | 1 | 1 | ⅞ = 87.5% |
| | Phone | 1 | 1 | |
| | Email | 1 | 1 | |
| | PO box | 1 | 0 | |
| | Building number | 1 | 1 | |
| | Street | 1 | 1 | |
| | City | 1 | 1 | |
| | country | 1 | 1 | |

Next, since each block confidence is above the block confidence threshold, the region confidence may be calculated based on the region confidence equation as 2/2=100. The region confidences of controversial region 1 for FIGS. 4 and 5 are shown in Table 9 below.

TABLE 9

| Controversial region | Block | Block Confidence | Region Confidence |
|---|---|---|---|
| Region 1 in FIG. 4 | Block 400 | 80% | 100% |
| | Block 410 | 87.5% | |
| Region 1 in FIG. 5 | Block 500 | 0 | 0% |

Further, for the controversial region 2, the block confidences and region confidences are shown in Tables 10-13 below.

TABLE 10

| Block Pattern | Entity | Match in text block 430 | Block confidence |
|---|---|---|---|
| Inventory | Item | √ | ½ = 50% |
| | Number of item | × | |

TABLE 11

| Block Pattern | Entity | Match in text block 440 | Block confidence |
|---|---|---|---|
| Inventory | Item | × | 0/2 = 0% |
| | Number of item | × | |

TABLE 12

| Block Pattern | Entity | Match in text block 520 | Block confidence |
|---|---|---|---|
| Inventory | Item | √ | 2/2 = 100% |
| | Number of item | √ | |

TABLE 13

| Controversial region | Block | Block Confidence | Region Confidence |
|---|---|---|---|
| Region 2 in FIG. 4 | Block 430 | 50% | 0% |
| | Block 440 | 0% | |
| Region 2 in FIG. 5 | Block 520 | 100% | 100% |

In some embodiments, when the region confidence of a controversial region under the second block segmentation is higher than a region confidence of a corresponding controversial region under the first block segmentation, the segmented text blocks of the first block segmentation in the controversial region may be replaced by the re-segmented text blocks.

For example, for controversial region 1, since the region confidence (0%) of the controversial region 1 in FIG. 5 is less than the region confidence (100%) of the controversial region 1 in FIG. 4, the replacement may not be performed. However, for controversial region 2, since the region confidence (100%) of the controversial region 2 in FIG. 5 is higher than the region confidence (05) of the controversial region 2 in FIG. 4, text blocks 430 and 440 may be replaced by text block 520.

In some embodiments, a region confidence threshold (e.g., 80%) may be set. If the region confidence of the controversial region is above the region confidence threshold, the process ends and the adjusted text block layout may be regarded as the final text block layout of the document page. However, if the region confidence of the controversial region is less than the region confidence threshold, steps S810, S812, S814, S816, and S818 may be repeated again to further adjust the text block layout.

Figure 9:
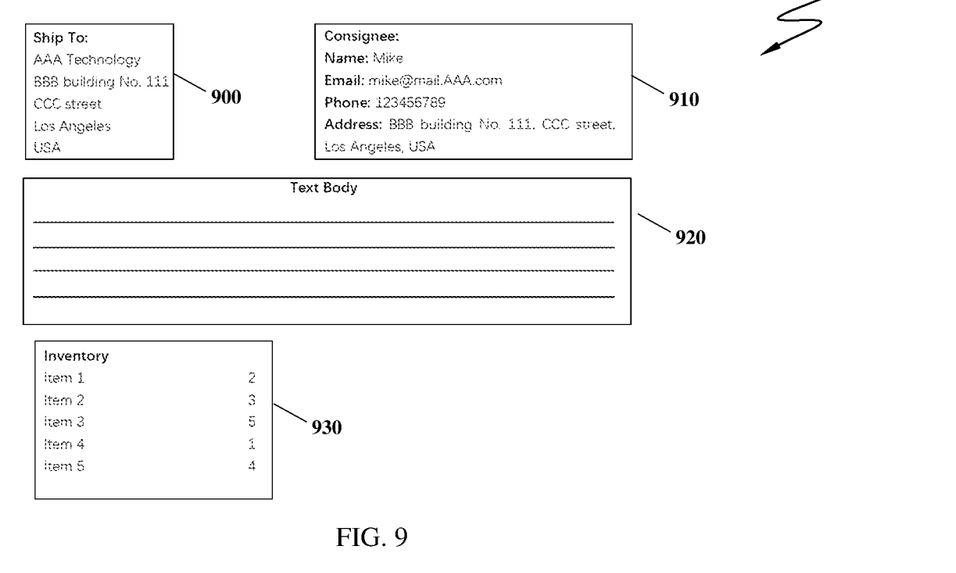
FIG. 9 depicts an exemplary adjusted text block layout for the document page of FIGS. 4 and 5, generally designated 950, in accordance with at least one embodiment of the present invention.

FIG. 9 depicts an exemplary adjusted text block layout for the document page of FIGS. 4 and 5, generally designated 950, in accordance with at least one embodiment of the present invention. As depicted in FIG. 9, blocks 900, 910, 920 respectively correspond to blocks 400, 410, 420 of FIG. 4 segmented with Algorithm A, while block 930 corresponds to block 520 of FIG. 5 segmented with Algorithm B. Thus, it can be seen that the text block segmentation algorithms used in different regions of a page may be adaptively adjusted, so that an optimized text block layout may be obtained.

What is claimed is:

1. A computer-implemented method for text block segmentation, comprising:
   receiving a digital image of a text document;
   determining a first text block segmentation pattern utilized to generate a digital segmented text block for the digital image based, at least in part, on a comparison of semantic information associated with the digital segmented text block and a plurality of predefined types of text block segmentation patterns indicated by a graph, wherein non-leaf nodes of the graph represent types of text block segmentation pattern and leaf nodes stemming from the non-leaf nodes represent associated semantic entities;

calculating a first degree of confidence in a size of the digital segmented text block for the digital image based, at least in part, on comparing semantic entities associated with the digital segmented text block with semantic entities indicated by leaf nodes stemming from a first non-leaf node representative of the first type of text block segmentation pattern;

determining that the size of the digital segmented text block for the digital image is non-optimal based on the calculated degree of confidence in the size of the digital segmented text block being below a predetermined threshold;

responsive to determining that the size of the digital segmented text block for the digital image is non-optimal, altering the size of the digital segmented text block for the digital image based, at least in part, on re-segmenting the digital segmented text block for the digital image; and performing text extraction based on the re-segmented digital text block for the digital image.

2. The computer-implemented method of claim 1, further comprising:

calculating a second degree of confidence in a size of the re-segmented text block; and replacing the segmented text block with the re-segmented text block in response to the second degree of confidence in the size of the re-segmented text block being greater than the first degree of confidence in the size of the segmented text block.

3. The computer-implemented method of claim 1, wherein re-segmenting the segmented text block further includes:

determining to increase the size of the segmented text block if a number of semantic entities included in the segmented text block is less than a number of leaf nodes stemming from the first non-leaf node representative of the first type of text block segmentation pattern; and determining to decrease the size of the segmented text block if a number of semantic entities included in the segmented text block is greater than a number of leaf nodes stemming from the first non-leaf node representative of the first type of text block segmentation pattern.

4. The computer-implemented method of claim 3, further comprising:

responsive to determining to increase the size of the segmented text block, selecting a second non-leaf node representative of a second type of text block segmentation pattern, wherein the second non-leaf node is located subsequent to the first non-leaf node in the graph; and re-segmenting the segmented text block utilizing the second type of text block segmentation pattern to increase the size of the segmented text block.

5. The computer-implemented method of claim 3, further comprising:

responsive to determining to decrease the size of the segmented text block, selecting a third non-leaf node representative of a third type of text block segmentation pattern, wherein the third non-leaf node is located prior to the first non-leaf node in the graph; and re-segmenting the segmented text block utilizing the third type of text block segmentation pattern to decrease the size of the segmented text block.

6. The computer-implemented method of claim 1, further comprising:

generating Key-Value Pairs (KVPs) from the semantic information associated with the segmented text block, wherein a key of a KVP corresponds to a primary semantic category, and values of the KVP correspond to respective semantic entities associated with the primary semantic category.

7. The computer-implemented method of claim 6, wherein determining the first text block segmentation pattern from a plurality of predefined types of text block segmentation patterns utilized to generate the segmented text block is further based on:

identifying leaf nodes in the graph that match respective values of the KVPs associated with the segmented text block;

identifying non-leaf nodes connected to the leaf nodes in the graph that match the respective values of the KVPs associated with the segmented text block; and selecting the non-leaf node having a highest percentage of connected leaf nodes that match the respective values of the KVPs associated with the segmented text block.

8. A computer program product for text block segmentation, the computer program product including one or more computer readable storage media and program instructions stored on the one or more computer readable storage media, the program instructions being executable by one or more computer processors to:

receive a digital image of a text document;

determine a first text block segmentation pattern utilized to generate a digital segmented text block for the digital image based, at least in part, on a comparison of semantic information associated with the digital segmented text block and a plurality of predefined types of text block segmentation patterns indicated by a graph, wherein non-leaf nodes of the graph represent types of text block segmentation pattern and leaf nodes stemming from the non-leaf nodes represent associated semantic entities;

calculate a first degree of confidence in a size of the digital segmented text block for the digital image based, at least in part, on comparing semantic entities associated with the digital segmented text block with semantic entities indicated by leaf nodes stemming from a first non-leaf node representative of the first type of text block segmentation pattern;

determine that the size of the digital segmented text block for the digital image is non-optimal based on the calculated degree of confidence in the size of the digital segmented text block being below a predetermined threshold;

responsive to determining that the size of the digital segmented text block for the digital image is non-optimal, alter the size of the digital segmented text block for the digital image based, at least in part, on re-segmenting the digital segmented text block for the digital image; and perform text extraction based on the re-segmented digital text block for the digital image.

9. The computer program product of claim 8, further comprising program instructions to:

calculate a second degree of confidence in a size of the re-segmented text block; and replace the segmented text block with the re-segmented text block in response to the second degree of confidence in the size of the re-segmented text block being greater than the first degree of confidence in the size of the segmented text block.

10. The computer program product of claim 8, wherein the program instructions to re-segment the segmented text block further include instructions to:
- determine to increase the size of the segmented text block if a number of semantic entities included in the segmented text block is less than a number of leaf nodes stemming from the first non-leaf node representative of the first type of text block segmentation pattern; and
- determine to decrease the size of the segmented text block if a number of semantic entities included in the segmented text block is greater than a number of leaf nodes stemming from the first non-leaf node representative of the first type of text block segmentation pattern.

11. The computer program product of claim 10, further comprising, responsive to determining to increase the size of the segmented text block, program instructions to:
- select a second non-leaf node representative of a second type of text block segmentation pattern, wherein the second non-leaf node is located subsequent to the first non-leaf node in the graph; and
- re-segment the segmented text block utilizing the second type of text block segmentation pattern to increase the size of the segmented text block.

12. The computer program product of claim 10, further comprising, responsive to determining to decrease the size of the segmented text block, program instructions to:
- select a third non-leaf node representative of a third type of text block segmentation pattern, wherein the third non-leaf node is located prior to the first non-leaf node in the graph; and
- re-segment the segmented text block utilizing the third type of text block segmentation pattern to decrease the size of the segmented text block.

13. The computer program product of claim 8, further comprising program instructions to:
- generate Key-Value Pairs (KVPs) from the semantic information associated with the segmented text block, wherein a key of a KVP corresponds to a primary semantic category, and values of the KVP correspond to respective semantic entities associated with the primary semantic category.

14. The computer program product of claim 13, wherein the program instructions to determine the first text block segmentation pattern from a plurality of predefined types of text block segmentation patterns utilized to generate the segmented text block further includes instructions to:
- identify leaf nodes in the graph that match respective values of the KVPs associated with the segmented text block;
- identify non-leaf nodes connected to the leaf nodes in the graph that match the respective values of the KVPs associated with the segmented text block; and
- select the non-leaf node having a highest percentage of connected leaf nodes that match the respective values of the KVPs associated with the segmented text block.

15. A computer system for text block segmentation, comprising:
- one or more computer processors;
- one or more computer readable storage media; and
- computer program instructions, the computer program instructions being stored on the one or more computer readable storage media for execution by the one or more computer processors, and the computer program instructions including instructions to:
- receive a digital image of a text document;
- determine a first text block segmentation pattern utilized to generate a digital segmented text block for the digital image based, at least in part, on a comparison of semantic information associated with the digital segmented text block and a plurality of predefined types of text block segmentation patterns indicated by a graph, wherein non-leaf nodes of the graph represent types of text block segmentation pattern and leaf nodes stemming from the non-leaf nodes represent associated semantic entities;
- calculate a first degree of confidence in a size of the digital segmented text block for the digital image based, at least in part, on comparing semantic entities associated with the digital segmented text block with semantic entities indicated by leaf nodes stemming from a first non-leaf node representative of the first type of text block segmentation pattern;
- determine that the size of the digital segmented text block for the digital image is non-optimal based on the calculated degree of confidence in the size of the digital segmented text block being below a predetermined threshold;
- responsive to determining that the size of the digital segmented text block for the digital image is non-optimal, alter the size of the digital segmented text block for the digital image based, at least in part, on re-segmenting the digital segmented text block for the digital image; and
- perform text extraction based on the re-segmented digital text block for the digital image.

16. The computer system of claim 15, further comprising program instructions to:
- calculate a second degree of confidence in a size of the re-segmented text block; and
- replace the segmented text block with the re-segmented text block in response to the second degree of confidence in the size of the re-segmented text block being greater than the first degree of confidence in the size of the segmented text block.

17. The computer system of claim 15, wherein the program instructions to re-segment the segmented text block further include instructions to:
- determine to increase the size of the segmented text block if a number of semantic entities included in the segmented text block is less than a number of leaf nodes stemming from the first non-leaf node representative of the first type of text block segmentation pattern; and
- determine to decrease the size of the segmented text block if a number of semantic entities included in the segmented text block is greater than a number of leaf nodes stemming from the first non-leaf node representative of the first type of text block segmentation pattern.

* * * * *